United States Patent Office 2,971,950
Patented Feb. 14, 1961

2,971,950
PRODUCTION OF ISOTACTIC POLY(ALPHA-OLEFINS) HAVING REGULATED MOLECULAR WEIGHT

Giulio Natta, Italo Pasquon, Ettore Giachetti, and Francesco Scalari, all of Milan, Italy, assignors to Montecatini-Società Generale per l'Industria Mineraria e Chimica, Milan, Italy No Drawing. Filed July 29, 1958, Ser. No. 751,608
Claims priority, application Italy Aug. 5, 1957
8 Claims. (Cl. 260—93.7)

This invention relates to improvements in the stereospecific polymerization of alpha-olefins of the general formula $$CH_2=CHR$$

where R is an alkyl or aryl radical containing from 1 to 16 carbon atoms to polymerizates consisting prevailingly to substantially of isotactic polymers.

The primary object of this invention is to provide a new and improved method for producing crude polymerizates of the alpha-olefins, and more particularly of propylene, which consist prevailingly to substantially of isotactic polymers and have a controlled, predetermined molecular weight.

The pending application Ser. No. 550,164, in which one of us (G. Natta) is co-inventor discloses that crude polymerizate of the alpha-olefins which are prevailingly to substantially non-extractable with boiling n-heptane and consist prevailingly to substantially of isotactic polymers can be obtained by polymerizing the monomer in an inert hydrocarbon solvent with highly stereospecific catalysts prepared directly from halides of certain heavy metals in which the metal has a valency lower than the maximum, e.g., crystalline violet $TiCl_3$, and organometallic compounds such as aluminum alkyls, e.g. aluminum triethyl.

Isotactic polymers of alpha-olefins such as propylene are new polymers which consist substantially of isotactic macromolecules, that is, of linear, regular head-to-tail macromolecules having substantially no branches longer than R and substantially the isotactic structure. The isotactic structure is characterized in that substantially all of the tertiary asymmetric carbon atoms of adjacent monomeric units have the same steric configuration and, when the main chain of the macromolecule is arbitrarily assumed to be fully extended in a plane, substantially all of the R substituents on the tertiary carbon atoms are on one side (e.g., above) and the hydrogen atoms on the other side (e.g., below) of the plane of the chain. In a successive isotactic portion of the same chain the positions of the R and H substituents may be reversed with respect to the positions occupied thereby in the preceding portion.

The polypropylene obtained by effecting the polymerization as described and at temperatures between 0° C. and 100° C. has an intrinsic viscosity, determined in tetrahydronaphthalene at 135° C., which is generally between 2.5 and 4.5 x 100 cc./g. That is, the polymers conventionally have a molecular weight of between 100,000 and 300,000, calculated according to the formula $$[\mu]=1.18 \times 10^{-3}(M.W.)^{-0.65}$$

In other pending applications involving G. Natta, it is disclosed that the intrinsic viscocsity of the propylene polymers, and therefore the molecular weight thereof, can be controlled by regulating the amount of catalyst present in the reaction system, provided that particularly pure, solid catalysts are used. However, such regulation requires sharp variations in the catalyst concentration.

It has also been disclosed, in still another pending application by G. Natta and co-workers, that the molecular weight of polypropylene can be regulated by polymerizing the monomer in the presence of catalysts prepared from aluminum trialkyls and halides of titanium or other transition metals having a valency lower than the maximum valency corresponding to the position of the metal in the Mendeleef Periodic Table under relatively high hydrogen pressures.

We find that the objective of this present invention of producing isotactic polypropylene of regulated (reduced as compared to the normal) molecular weight can be accomplished by incorporating in the mixture comprising the monomer and the stereospecific catalyst a small amount of a polar compound having the general formula AX, where A is hydrogen or a hydrocarbon radical, e.g. an alkyl radical of from 1 to 5 carbon atoms, and X is halogen, for example a hydrohalogenic acid, such as HCl, an organic halide such as ethyl chloride, etc., which is capable of forming, with the trialkyl aluminum or with the low valency transition metal halide, complexes of the following type:

$$[A]^+[AlR_3X]^{(-)}$$

and $$[A]^+[TiCl_3X]^{(-)}$$

The rate of polymerization and the stereospecificity of the catalyst are not altered to any marked extent by the addition of the compounds AX to the reaction mass, provided that such compounds are added in amounts between 0.5 and 100 mols per 100 mols of the metalorganic compound (e.g. alkyl aluminum) used in preparing the catalyst.

If the amount of the compound AX used exceeds 100 mols per 100 mols of the alkyl aluminum, the effect thereof in reducing the molecular weight is enhanced but the stereospecificity and activity of the catalyst are decreased.

The mechanism by which the compounds AX regulate the molecular weight of the polypropylene produced is not entirely clear. However, it can be assumed that those compounds act, either directly or indirectly, on the chain termination through an ionic process.

The polar compound AX can be dissolved in a quantity of the inert hydrocarbon solvent used as the polymerization medium, and the solution thus obtained can then be added to the catalytic mixture prior to the polymerization.

In general, and except for the addition of the compound AX to the reaction mass, the polymerization is carried out under the same conditions, i.e., temperatures and pressures, as disclosed in application Ser. No. 550,164.

The following examples are given to illustrate the invention, it being understood that these examples are not intended as limiting.

EXAMPLE 1

The following ingredients are introduced into a 500 cc. shaking autoclave kept at 70° C. under reduced pressure:

(1) An amount (in the range stated) of anhydrous HCl or of an alkyl halide dissolved in n-heptane.
(2) A suspension of $TiCl_3$ in n-heptane.
(3) A solution of $Al(C_2H_5)_3$ in n-heptane.
(4) 500 cc. of n-heptane (used for washing apparatus).

The mass is stirred under vacuum for 20 minutes, after which propylene is fed in at a rate such that, within a few minutes, a partial pressure of 1000 mm. mercury is attained.

Propylene is fed into the reaction mass continuously during the entire reaction at such a flow rate that the pressure is maintained constant at the starting value of 1000 mm. Hg. In the early stages of the reaction, the rate increases up to a maximum and thereafter remains substantially constant. After about two hours, the propylene feed is stopped, the autoclave is opened and discharged. Two liters of n-heptane, ½ liter of water and a few ccs. of concentrated HCl are added to the suspension discharged from the autoclave. After filtration, the water layer is removed from the filtrate and the polymer dissolved in the heptane solution is recovered by evaporation. The residue is then extracted successively with ether and boiling n-heptane.

The results obtained from polymerization runs in which various amounts of anhydrous hydrochloric acid and ethyl bromide are added to the catalyst are reported in the table below, together with the molecular weight of the residue remaining after treatment of the product with cold n-heptane, and in comparison with runs carried out without the addition of a compound AX to the system.

Table

[Polymerization of propylene to a polymerizate consisting prevailingly to substantially of isotactic polymer in the presence of $TiCl_3$, $Al(C_2H_5)_3$ and HCl. Polymerization runs carried out in 250 cc. n-heptane at 70° C. under a propylene partial pressure of 1,000 mm. Hg.]

| Run No. | $TiCl_3$, g. | $Al(C_2H_5)_3$, cc. | HCl, g. | reaction time, h. | Polymer obtained, g. | Polymer soluble in cold n-heptane, percent | Polymer extractable with boiling ether, percent | Polymer extractable with boiling n-heptane, percent | Residue after extraction with boiling n-heptane, percent | Intrinsic viscosity of the residue after extraction with cold n-heptane (100 cc./g.) | M.W. of the residue after extraction with cold n-heptane [1] |
|---|---|---|---|---|---|---|---|---|---|---|---|
| 1 | 0.84 | 2 | 0.020 | 2 | 17.1 | 12.1 | 0.7 | 5.1 | 82.1 | 1.92 | 87,000 |
| 2 | 0.84 | 2 | 0.018 | 2 | 17.5 | 12.3 | 0.5 | 4.8 | 82.4 | 1.95 | 90,000 |
| 3 | 0.84 | 2 | 0.20 | 4 | 33.7 | 18.7 | 1.8 | 10.0 | 69.5 | 1.68 | 71,000 |
| 4 | 0.84 | 2 | ---------- | 2 | 18.4 | 12.8 | 1.0 | 4.5 | 82.7 | 3.05 | 178,000 |
| 5 | 0.28 | 1 | 0.29 | 3½ | 12.8 | 24.3 | 1.0 | 6.0 | 68.7 | 1.90 | 86,000 |
| 6 | 0.28 | 1 | { $C_2H_5Br$ 0.07 } | 15 | 22.8 | 21.8 | 1.0 | 6.7 | 70.5 | 2.15 | 105,000 |
| 7 | 0.28 | 1 | ---------- | 3½ | 13.5 | 12.0 | 1.5 | 4.5 | 82.0 | 3.20 | 190,000 |
| 8 | 0.28 | 1 | ---------- | 15 | 40.5 | 11.5 | 1.0 | 5.0 | 82.5 | 3.18 | 188,000 |

[1] The M.W. is calculated from the expression $[\mu] 1.18 \times 10^{-3} (M.W.)^{0.65}$.

The effectiveness of even very small amounts of the compounds AX in controlling and reducing the molecular weight of the polypropylene is apparent from a consideration of the data set forth in the table.

The present method of regulating the molecular weight of the polypropylene has many important practical advantages over other previously proposed methods for accomplishing that objective. It does not require an increase or variation in the concentration of the catalyst used, or the use of pressures higher than the pressures normally used in the stereospecific catalysis of propylene.

The components for forming the stereospecific catalyst may be used in the same relative amounts as disclosed previously by Natta et al., i.e., the molar ratio of the transition metal halide and metalorganic compound may be 1:2.

In the preferred embodiment, the catalyst is prepared from a hydrocarbon-insoluble, solid, highly crystalline halide of a transition metal selected from the group consisting of titanium, zirconium and vanadium in which the metal has a valency lower than four and an alkyl compound of a metal selected from the group consisting of beryllium, magnesium and aluminum in which the alkyl radicals contain from 2 to 5 carbon atoms. It is a characteristic of these catalysts that the transition metal maintain its original low valency in the catalyst, throughout the preparation thereof and during use of the catalyst in the polymerization of the propylene.

The crude polymerizate obtained directly in this process consists of at least 75% of isotactic polymer, non-extractable with boiling n-heptane.

The compound of general formula AX can be, in addition to hydrogen chloride, also hydrogen fluoride or hydrogen bromide. Other alkyl halides can also be used, in general alkyl chlorides, bromides or iodides with alkyl groups containing 1 to 5 carbon atoms.

The process may be applied to the stereospecific polymerization of other alpha-olefins of the formula given and including butene-1, pentene-1, and styrene.

Various changes in details may be made in practicing the invention without departing from the spirit thereof. Therefore, we intend to include in the scope of the appended claims all such modifications as may be apparent to those skilled in the art.

What is claimed is:

1. In a process for the anionic stereospecific polymerization of propylene directly to a crude polypropylene consisting prevailingly to substantially of isotactic macromolecules, in which propylene is contacted in an inert hydrocarbon solvent with a stereospecific catalyst prepared by (1) starting with solid crystalline titanium trichloride and (2) mixing the trichloride with an alkyl aluminum compound, the improvement which comprises regulating the molecular weight of the polypropylene produced by including in the reaction mass, per 100 mols of the alkyl aluminum compound, from 0.5 to 100 mols of a polar compound having the formula AX in which A is selected from the group consisting of hydrogen and alkyl radicals containing from 1 to 5 carbon atoms, and X is halogen.

2. The process according to claim 1, characterized in that the catalyst is prepared from titanium trichloride and triethyl aluminum, and the molecular weight regulator is a hydrohalogen acid.

3. The process according to claim 2, further characterized in that the molecular weight regulator is an alkyl halide in which the alkyl groups contain from 1 to 5 carbon atoms.

4. The process according to claim 2, further characterized in that the molecular weight regulator is hydrochloric acid.

5. The process according to claim 2, further characterized in that the molecular weight regulator is ethyl bromide.

6. The process according to claim 2, further characterized in that the molecular weight regulator is added to the reaction mass in the form of a solution thereof in the inert hydrocarbon solvent used as the polymerization medium.

7. The process according to claim 2, further characterized in that the propylene is contacted with the catalyst in n-heptane, and a solution of hydrochloric acid in n-heptane is added to the reaction mass.

8. The process according to claim 2, further characterized in that the propylene is contacted with the catalyst in n-heptane, and a solution of ethyl bromide in n-heptane is added to the reaction mass.

References Cited in the file of this patent

UNITED STATES PATENTS

| | | |
|---|---|---|
| 2,846,427 | Findlay | Aug. 5, 1958 |
| 2,912,425 | Bailey et al. | Nov. 10, 1959 |

FOREIGN PATENTS

| | | |
|---|---|---|
| 526,101 | Italy | May 14, 1955 |
| 538,782 | Belgium | Dec. 6, 1955 |